(12) United States Patent
Baldwin

(10) Patent No.: US 6,845,939 B1
(45) Date of Patent: Jan. 25, 2005

(54) TAILBOOM-STABILIZED VTOL AIRCRAFT

(76) Inventor: G. Douglas Baldwin, 4 Harborview Rd., Port Washington, NY (US) 11050-1440

( * ) Notice: Subject to any disclaimer, the term of this patent is extended or adjusted under 35 U.S.C. 154(b) by 0 days.

(21) Appl. No.: 10/693,800

(22) Filed: Oct. 24, 2003

(51) Int. Cl.$^7$ ............................................. B64C 27/28
(52) U.S. Cl. ................................ 244/7 R; 244/137.1
(58) Field of Search ............................. 244/4 R, 7 R, 244/137.4, 137.1, 7 B, 7 C, 17.23

(56) References Cited

U.S. PATENT DOCUMENTS

| | | | | |
|---|---|---|---|---|
| 2,611,554 A | * | 9/1952 | Sanders ........................... | 244/6 |
| 2,936,968 A | * | 5/1960 | Mazzitelli .................... | 244/7 C |
| 3,474,987 A | * | 10/1969 | Meditz ........................ | 244/4 R |
| 3,532,302 A | | 10/1970 | Dean ........................ | 244/17.19 |
| 3,966,142 A | | 6/1976 | Corbett et al. ............. | 244/12 A |
| 4,071,206 A | | 1/1978 | Magill ...................... | 244/17.11 |
| 4,553,719 A | * | 11/1985 | Ott .......................... | 244/118.1 |
| 4,746,082 A | * | 5/1988 | Syms et al. .............. | 244/137.4 |
| 4,759,514 A | | 7/1988 | Burkam .................... | 244/17.21 |
| 4,928,907 A | | 5/1990 | Zuck ............................. | 244/6 |
| 4,984,757 A | * | 1/1991 | Hartung et al. .......... | 244/137.4 |
| 5,067,668 A | | 11/1991 | Zuck ........................... | 244/7 R |
| 5,096,143 A | | 3/1992 | Nash ........................... | 244/87 |
| 5,395,073 A | | 3/1995 | Rutan et al. .................. | 244/48 |
| 5,560,568 A | | 10/1996 | Schmittle .................... | 244/48 |
| 5,863,013 A | | 1/1999 | Schmittle .................... | 244/48 |
| 6,086,014 A | | 7/2000 | Bragg, Jr. ...................... | 244/2 |
| 6,347,764 B1 | | 2/2002 | Brandon et al. .......... | 244/17.11 |
| 6,598,827 B2 | | 7/2003 | Kusic ....................... | 244/17.11 |

OTHER PUBLICATIONS

Boeing Company. "V–22 Osprey Technical Specifications," web page from http://www.boeing.com/rotocraft/military/v22/v22spec.htm, dated 2003.

TBF1avenger_fly.jpg. Image from http://www.seniornet.org/ww2/gallery/photos/planes/TBF1avenger_fly.jpg, dated May 2001.

Declaration of G. Douglas Baldwin, dated May 19, 2004.

Declaration of Edwin A. Suominen, dated May 19, 2004.

"SkyTrain Open Rotor Aircraft," posted Sep. 2002 on applicant's web server as skytrain_concept_document.pdf.

"SkyTrain Open Rotor Aircraft: Concept Drawings" posted Sep. 2002 on applicant's web server as skytrain_concept_drawings.pdf.

(List continued on next page.)

*Primary Examiner*—Tien Dinh
(74) *Attorney, Agent, or Firm*—Edwin Suominen; Louis J. Hoffman (57) ABSTRACT

A disclosed flying craft includes a suspension structure having a first end and a second end, a lift unit, and a payload unit. The lift unit includes a nacelle and a tailboom, and pivotally couples to the first end of the suspension structure, and a payload unit couples to the structure's second end. Thus the tailboom can pivotally couple with respect to the payload unit, which advantageously permits the tailboom to assume an orientation desirable for a particular mode of flight. During vertical flight or hover, the tailboom can hang from the lift unit in an orientation that is substantially parallel to the suspension structure and that minimizes resistance to downwash from the lift unit. During horizontal flight, the tailboom can be orthogonal to the suspension structure, extending rearward in an orientation where it can develop pitching and yawing moments to control and stabilize horizontal flight. Advantageous variations and methods are also disclosed.

23 Claims, 9 Drawing Sheets

OTHER PUBLICATIONS

"SkyTrain Open Rotor Aircraft Concept as a response to Preliminary Assessment of a Cargo Helicopter External Load System Concept," posted Sep. 2002 on applicant's web server as response_to_preliminary_assessment.pdf.

Untitled drawings posted around Aug. 2002 on applicant's web server as army_drawings.pdf.

"Vertical Lift Military Transport," posted around Aug. 2002 on applicant's web server as army_specification.pdf.

"SkyTrain for Rapid Resupply," posted around Jul. 2002 on applicant's web server as army_presentation.pdf.

"Vertical Lift Military Transport," posted around Jun. 2002 on applicant's web server as Skytrain FAN FAQ.pdf.

Untitled drawings posted around Jun. 2002 on applicant's web server as electric_free_wing_aircraft.pdf.

Untitled drawings posted around Jun. 2002 on applicant's web server as fixed_wing_aircraft.pdf.

Untitled drawings posted around Jun. 2002 on applicant's web server as Skytrain Fan Drawings.pdf and army.pdf.

Untitled drawings posted around Jun. 2002 on applicant's web server as twin_engine_prototype.pdf.

Untitled drawings posted around Jun. 2002 on applicant's web server as ultralight_craft.pdf.

Video posted around Sep. 2002 on applicant's web server as heavy_lift.mpg (on included CD–ROM with items"BF," "BG").

Video posted around Aug. 2002 on applicant's web server as army_comparison.mpg (on included CD–ROM with items "BE," "BG").

Video posted around 0/02 on applicant's web server as army.mpg (on included CD–ROM with items "BE," "BF").

* cited by examiner

TAILBOOM-STABILIZED VTOL AIRCRAFT

BACKGROUND OF THE INVENTION

Vertical Takeoff and Landing (VTOL) aircraft have long been considered desirable because of their ability to hover in flight and transition in and out of flight without a runway, in addition to flying in a horizontal direction. The aircraft's lift unit or units have propulsors (e.g., rotor, tiltable jet engines) that develop an aggregate aerial motive force. This aerial motive force can be viewed as the combination of a vertical (i.e., countering gravity) and horizontal (i.e., parallel to ground) vector passing through a single point herein called the "center of lift." For a VTOL aircraft to be stable and controllable in hover or vertical flight, the vertical vector of its aerial motive force must pass through its center of mass.

Conventional single-rotor helicopters satisfy this requirement by having their center of mass directly below the rotor. (The number of rotors is typically considered the number of rotor axes, irrespective of whether a given "rotor" contains a single set of blades or a pair of counter-rotating sets.) However, that configuration prevents such an aircraft from tilting its rotor for axial flow in horizontal flight with lift developed by a fixed wing. Instead, it must rely on the rotor's own inefficient lift in edgewise airflow, with only enough rotor clearance available for a slight tilt to develop some horizontal airspeed.

As a compromise, aircraft have been developed that include tiltable rotors on opposite wingtips. This configuration has significant drawbacks, perhaps primarily that the prospect of blade interference with a centerline fuselage limits the diameter of paired co-planar rotors to less than half that of a comparable single rotor. The use of paired smaller diameter rotors hurts efficiency, resulting in a hovering propulsive force that is less than 70% of what a single rotor would produce for comparable engine power, but with over 40% greater downwash velocity.

Accordingly, it would be desirable to have a VTOL aircraft that could employ a single rotor for stable vertical flight and hover as well as efficient axial airflow in horizontal flight with lift provided by a fixed wing. It would also be desirable to have a VTOL aircraft, regardless of the type of lift unit employed, with improved control over transition between horizontal flight and vertical or hovering flight.

SUMMARY OF THE INVENTION

A flying craft according to various aspects of the present invention includes a substantially rigid suspension structure having a first end and a second end, a lift unit, and a payload unit. The lift unit includes a nacelle (typically housing one or more engines) and a tailboom, and pivotally couples to the first end of the suspension structure. A payload unit couples to the structure's second end. Thus the tailboom can pivotally couple with respect to the payload unit, which advantageously permits the tailboom to assume an orientation desirable for a particular mode of flight.

According to a particularly advantageous aspect of the invention, the lift unit can employ a rotor as a propulsion subsystem to provide an aerial motive force. In a mode of flight where such force is predominantly countering gravity (vertical flight or hover), the tailboom can hang from the lift unit in an orientation substantially parallel to the suspension structure and minimizing resistance to downwash from the lift unit. During a mode of flight in which the rotor (or other suitable propulsion subsystem) provides an aerial motive force predominantly parallel to the ground (horizontal flight), the tailboom can be orthogonal to the suspension structure, extending rearward in an orientation where it can develop pitching and yawing moments to control and stabilize horizontal flight.

In a method of the invention, a payload unit pivotally couples to a lift unit having a propulsion subsystem (e.g., a rotor) and tailboom such that the tailboom and payload unit are free to independently pivot with respect to the lift unit about parallel axes. The lift unit operates in multiple modes during the method. In a first mode, the propulsion subsystem provides an aerial motive force that predominantly counters gravity. In other words, the force has a vertical vector that is larger than any combination of horizontal vectors, given a normal frame of reference with respect to the ground. During at least a portion of this first mode, the tailboom latches to the payload unit in a substantially vertical orientation. At some point with lift provided by a fixed wing, the lift unit transitions to a second mode in which its propulsion subsystem provides an aerial motive force that is predominantly parallel to the ground, i.e., with a smaller vertical vector than combined horizontal vectors. During at least a portion of this second mode, the tailboom is released from the payload unit and is allowed to pivot independently of the payload unit. When released, the tailboom can assume the rearward-extending orientation desirable for horizontal flight.

The above summary does not include an exhaustive list of all aspects of the present invention. Indeed, the inventor contemplates that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

FIG. 9 including

FIG. 10 including

DESCRIPTION OF PREFERRED EXEMPLARY EMBODIMENTS

A VTOL flying craft according to various aspects of the present invention employs a tailboom to facilitate efficient, stable flight in both vertical and horizontal modes. As may be better understood with reference to FIG. 1, for example, one such flying craft 100 includes a suspension structure 110, a payload unit 130, and a lift unit 120 that includes a nacelle 128 and a tailboom 140. One end 113 of suspension structure 110 pivotally couples to lift unit 120 while an opposite end 115 pivotally couples to payload unit 130. Lift unit 120 further includes an aerodynamic lift structure 150.

A lift unit according to various aspects of the invention includes any heavier-than-air structure suitable for developing an aerial motive force including an upward component without exerting a corresponding force on any external supporting structure or relying on aerostatic buoyancy. A lift unit can develop such a force from a suitably configured propulsion subsystem, an aerodynamic lift structure, or both. As illustrated in the exploded perspective view of FIG. 2, for example, lift unit 120 includes both a rotor 200 mounted on a hub 126 (which extends from one end of nacelle 128) and an aerodynamic lift structure 150.

In accordance with various aspects of the invention, a nacelle is a structure, typically having an aerodynamically streamlined outer shell, that serves as a central point of pivotal attachment between a lift unit and a suspension structure, and between a tailboom and other portions of a lift unit. A nacelle typically includes one or more engines, a gearbox, and other structure that the lift unit can employ to drive a propulsion subsystem. However, a nacelle can suitably omit some or all of such structure if desired, e.g., where the propulsion subsystem employs a rotor with tip-mounted jet engines on its blades. As used herein, the term "nacelle" includes an overall structure consisting not just of the outer shell that is typically but not necessarily employed for protection and aerodynamics, but also whatever internal structure is employed to pivotally couple the lift unit to the suspension structure and pivotally couple the tailboom to the remainder of the lift unit.

Figure 2:
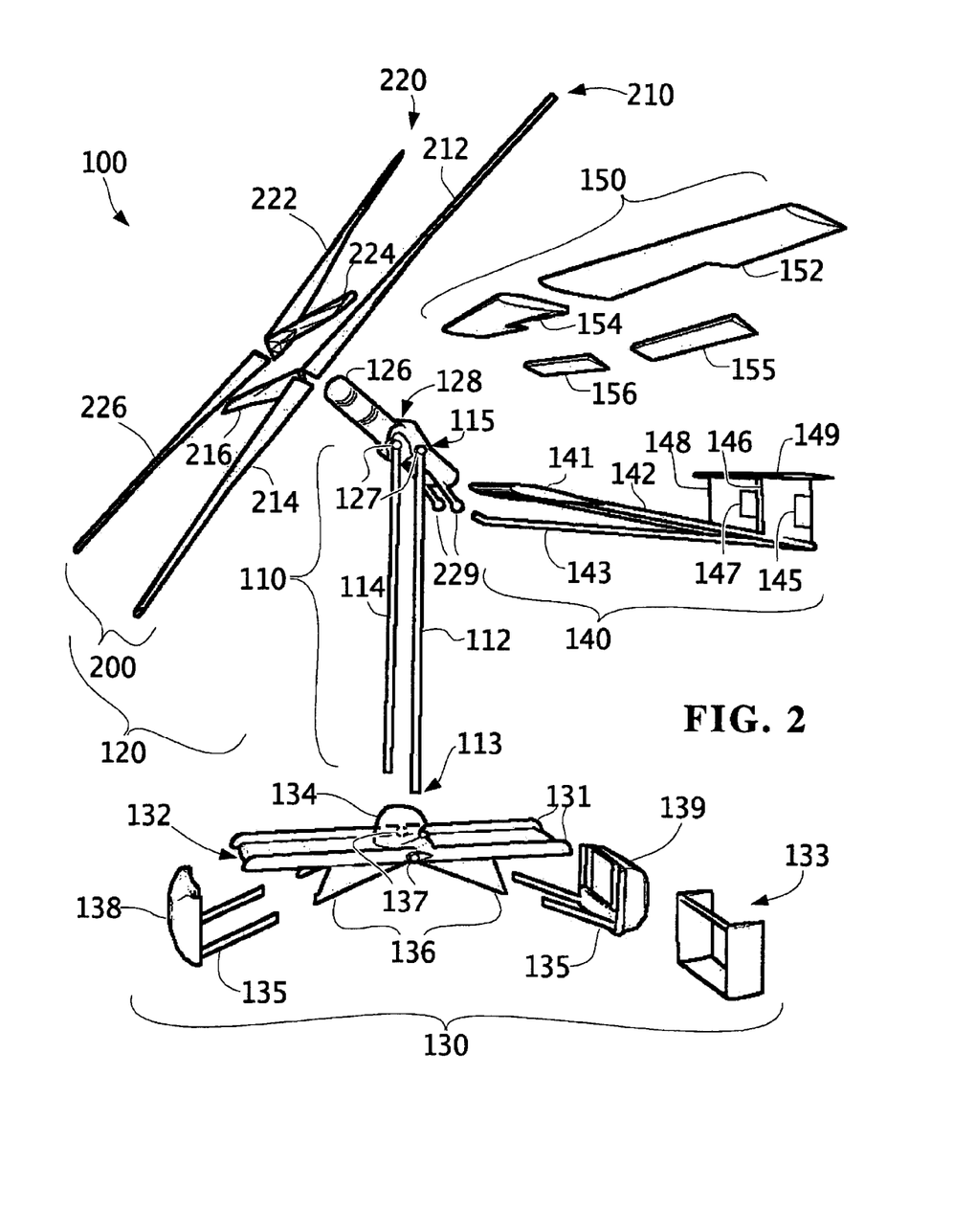
FIG. 2 is an exploded perspective view of the flying craft of FIG. 1.

A rotor, which is a particularly advantageous type of propulsion subsystem, can include any configuration of airfoil blades mounted on a hub in a configuration suitable for the blades to rotate on an axis about the hub and thereby generate an aerial motive force parallel to the axis. For example, rotor 200 consists substantially of two sets 210, 220 of rotor blades. Set 210 consists of blades 212, 214, 216 while set 220 consists of blades 222, 224, 226. Blade sets 210, 220 are independently rotatable about hub 126, a configuration that permits the sets to rotate in opposite directions and thus neutralize the moment they individually generate about the axis passing through nacelle 128 and hub 126. Separate turboshaft engines in nacelle 128 drive blade sets 210, 220 of rotor 200.

Any structure suitable for supporting a set of rotor blades for rotation about an axis can be employed as a hub. For example, hub 126 includes a pair of coaxial torsional shafts (not shown) and two sets 310, 320 (FIG. 3) of latchable pivot couplings. Each torsional shaft couples mechanical energy from a gear box driven by an engine or engines (not shown) inside lift unit nacelle 128 to rotor blade sets 210, 220.

Many other types of propulsion subsystems can be suitably employed to develop an aerial motive force including an upward component, including those employed by embodiments 10, 100, 200, and 1600 of commonly owned, co-pending patent application Ser. No. 09/976,348, filed Oct. 12, 2001 by the same inventor as the present application, which is incorporated by reference and referred to herein as the '348 application.

Lift structure 150 includes wing panels 152, 154, which pivotally couple to opposite sides of a fixed central airfoil portion 141 of tailboom 140. Wing panels 152, 154 include partial span flaps 155, 156 that can deploy for increased lift during transition between vertical and horizontal modes of flight. An aerodynamic lift structure according to various aspects of the invention is not limited to exemplary wing panels 152, 154 but can be any structure suitable for developing a significant upward aerodynamic force, as appropriate for the particular aircraft's purposes, upon passing horizontally through a fluid medium, typically ambient air. Examples of other aerodynamic lift structures include those employed by embodiments 10, 100, 200, and 6800 of the '348 application.

Rotor 200 acts in a gyrodynamically neutral fashion while generating an aerial motive force, powered by a suitable converter of fuel (or any other suitable source of stored energy, e.g., a battery) into mechanical energy. With such neutrality, an aircraft has improved pitch and yaw control in vertical flight. Gyrodynamic theory predicts that a gyroscope, when acted upon by a moment, will move through an angular displacement at a right angle to the applied moment. One method to neutralize this effect is to place a second gyroscope on the same axis as the first gyroscope, with the gyroscopes spinning at the same rate in opposite directions. Employing this method, the operation of blade set 220 rotating counter to blade set 210 is for practical purposes gyrodynamically neutral. Unlike a gyroscopic rotor comprised of a single set of blades, a gyrodynamically neutral system does not distort the effects of pitching and yawing moments. Freedom from such distortion improves pitch and yaw control.

As may be better understood with reference to FIG. 2, tailboom 140 of exemplary flying craft 100 pivotally couples to lift unit 120, at about the midpoint of the upper side of lift unit nacelle 128, by mechanical structure not shown. Suitable structure for such coupling includes, for example, a hinge at the leading edge of central airfoil 141.

Figure 1:
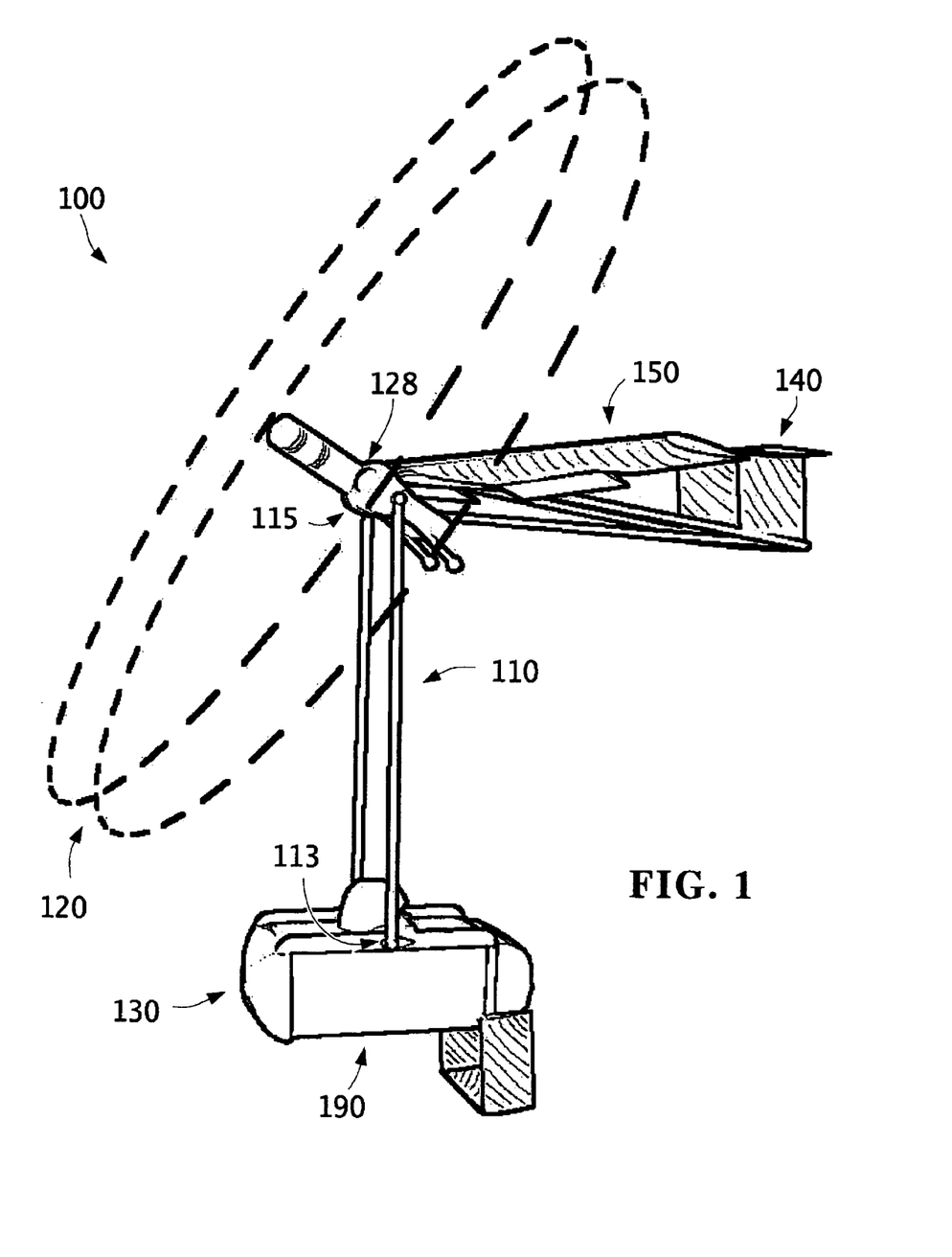
FIG. 1 is a perspective view of a flying craft according to various aspects of the present invention in transition between vertical and horizontal modes of flight.
Figure 3:
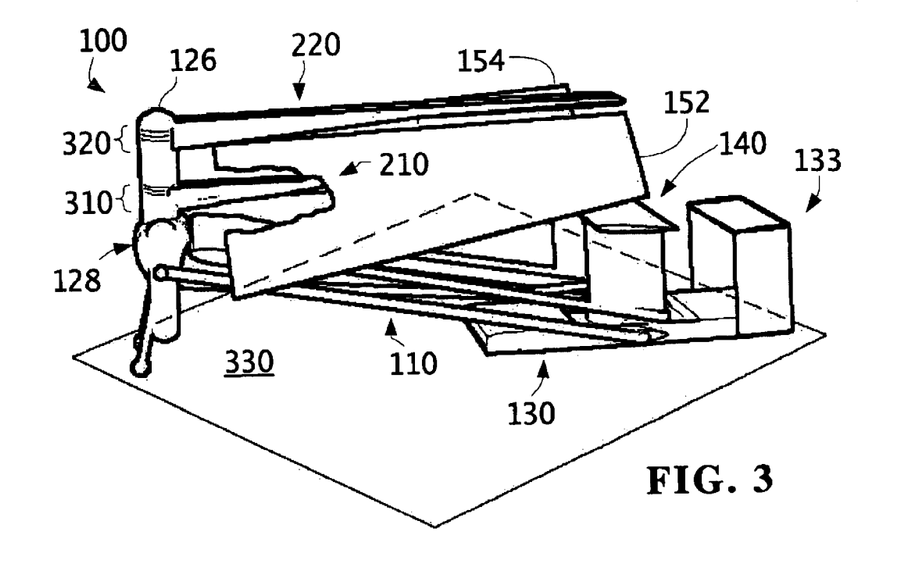
FIG. 3 is a perspective view of the flying craft of FIG. 1 in a stowed configuration.
Figure 4:
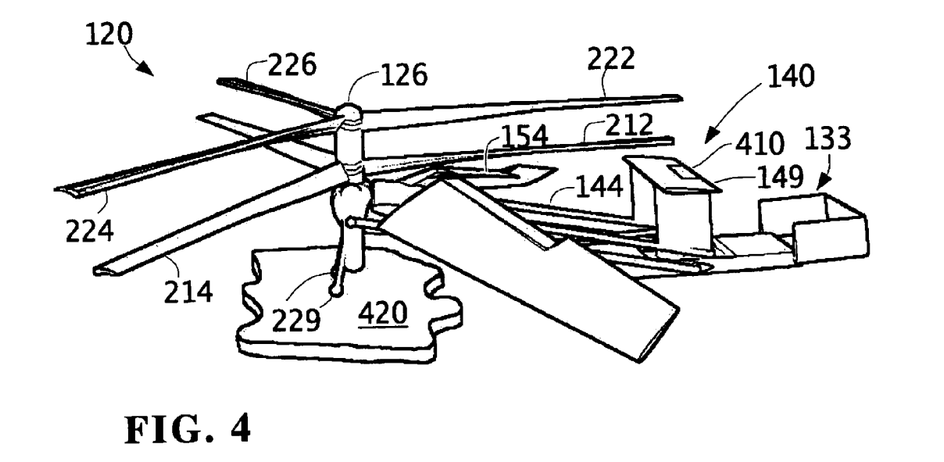
FIG. 4 is a perspective view of the flying craft of FIG. 1 in a deployed configuration before operation of the lift unit.

Pivotal coupling between tailboom 140 and lift unit 120 is not strictly necessary for tailboom 140 to have the desirable capability of orienting in the vertical direction for vertical flight and extending horizontally for horizontal flight because tailboom 140 is free to pivot (together with lift unit 120) with respect to payload unit 130. However, tailboom 140 is capable of various orientations with respect to rotor 200 when pivotally coupled to lift unit 120. As illustrated in FIG. 1, for example, tailboom 140 can extend mostly horizontal from lift unit 120 when rotor 200 (FIG. 2) is oriented somewhat vertically but producing a mostly horizontal air stream due to horizontal flight of craft 100. Another benefit of pivotal coupling between tailboom 140 and lift unit 120 is that, as illustrated in FIGS. 3–4, nacelle 128 can be oriented vertically alongside payload unit 130 with tailboom 140 and suspension structure 110 oriented substantially horizontal between nacelle 128 and payload unit 130.

Lift unit 120 includes landing gear 229 (FIG. 2) that supports lift unit 120 when craft 100 is in a stowed configuration, as further discussed below with reference to FIG. 3. Landing gear 229 can be, e.g., a set of wheels having sufficient dimensions and structural integrity to support weight of lift unit 120, or a fixed structure designed to fit into a mated receptacle.

A suspension structure according to various aspects of the invention includes any structure suitable for suspending a payload unit from a lift unit. For example, suspension structure 110 includes a pair of tensile members 112, 114 that are fabricated from suitable materials (e.g., carbon graphite) in a suitable structural configuration (e.g., extruded hollow-core piping with aerodynamic cross-section, optionally including fuel pipes and mechanical and/or electrical power and control cables) to suspend payload unit 130 and payload 190 from lift unit 120 during all expected flight conditions of craft 100.

In exemplary flying craft 100, lift unit 120 couples to payload unit 130 through a suspension structure 110 that is rigid. Rigidity of tensile members 112, 114 helps maintain structural integrity of craft 100 in its stowed and initial deployment configurations. As discussed below, those configurations are illustrated in FIGS. 3 and 4, respectively. Suspension structures according to various aspects of the invention can have many advantageous variations, as may be better understood with reference to paragraph 96 (yaw control) and paragraphs 104–105, 107, 111–112, 128–130, and 135 (damped elastic structure) of the '348 application.

Advantageously, a suspension structure of a vertical lift flying craft according to various aspects of the invention can pivotally couple to a lift unit about one axis while being constrained from rotation about the two orthogonal axes. By permitting rotation about one axis and restricting rotation about the others, such a configuration permits movement of a suspended payload unit within a common plane with the lift unit while preventing the payload unit from substantial lateral deviations outside that plane. For example, bearings 127 at end 115 of suspension structure 110 permit fore and aft movement of payload unit 130 but restrict sideways movement. Thus, the plane of permissible movement is parallel to the direction of horizontal flight, and flying craft 100 enjoys roll stability as a result.

As illustrated in FIG. 2, lift unit 120 has bearings 127 mounted on sides of its nacelle 128 that pivotally couple to the top ends of tubes 112,114. In addition, payload unit 130 includes bearings 137 that pivotally couple to the bottom terminations of tubes 112, 114. Thus lift unit 120 suspension pivotally couples to end 115 of suspension structure 110, while payload unit 130 pivotally couples to the opposite end 113 of suspension structure 110.

Pivoting between structural members, in accordance with various aspects of the invention, employs any type of structure that permits axial rotation between two members while transferring lateral forces from one member to another. One example of such structure is a conventional bearing that includes a first member that is (or includes) at least one shaft and a second member coupled to the first member such that the shaft is free to rotate but not move laterally with respect to the second member. Another example is shown as element 102 in FIG. 4 of the '348 application and accompanying text. Other types of pivot structures include ball-and-socket arrangements and lengths of flexible cable.

Figure 6:
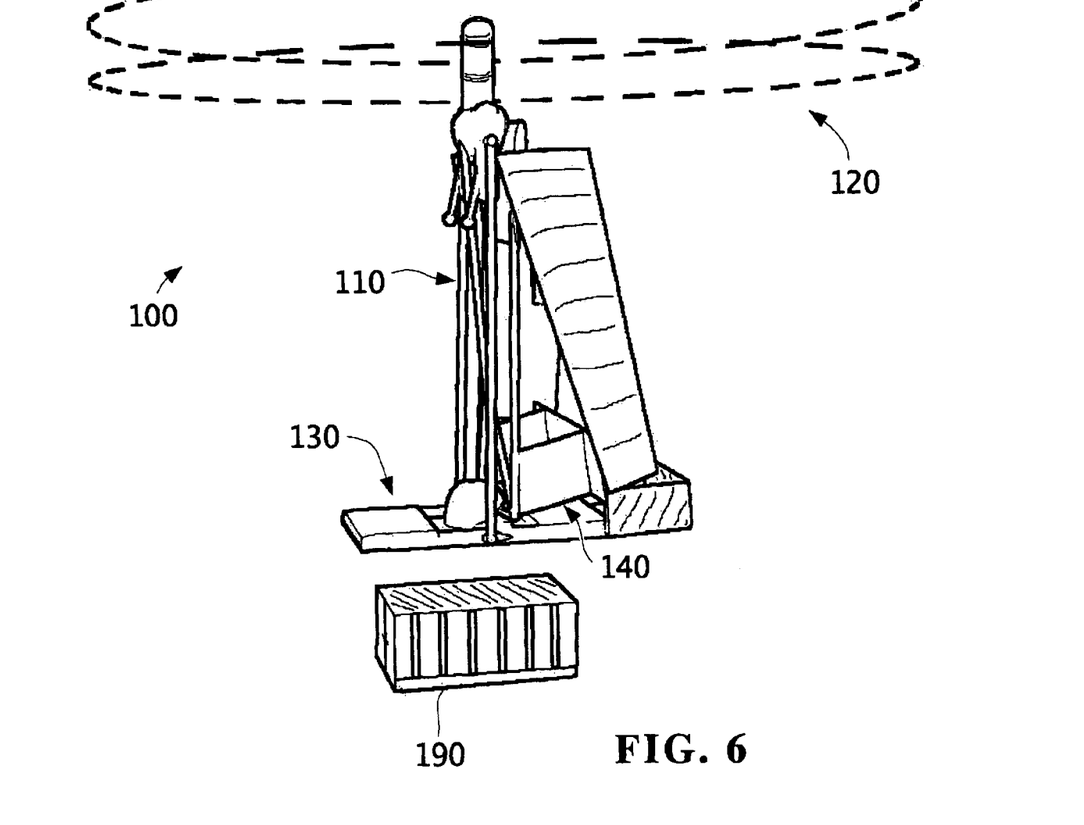
FIG. 6 is a perspective view of the flying craft of FIG. 1 during operation of the lift unit hovering above a payload to be transported.
Figure 7:
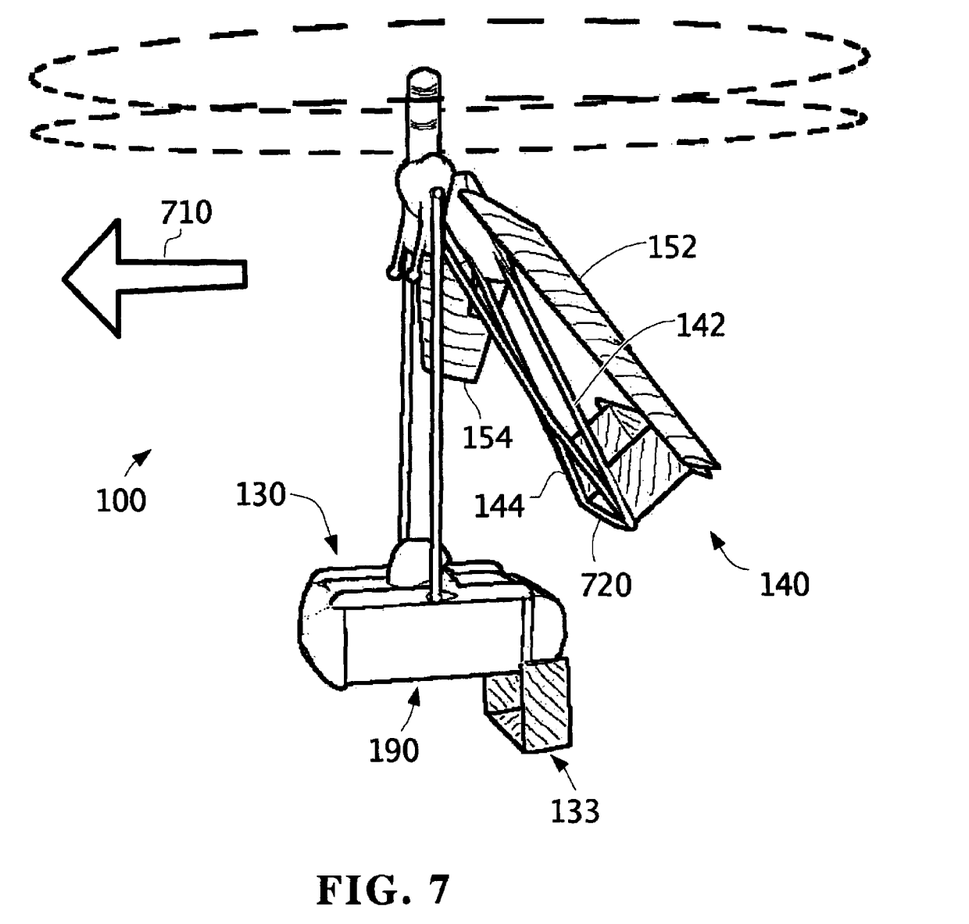
FIG. 7 is a perspective view of the flying craft of FIG. 1 during operation of the lift unit in a vertical mode of flight with the payload of FIG. 6 in transit.
Figure 8:
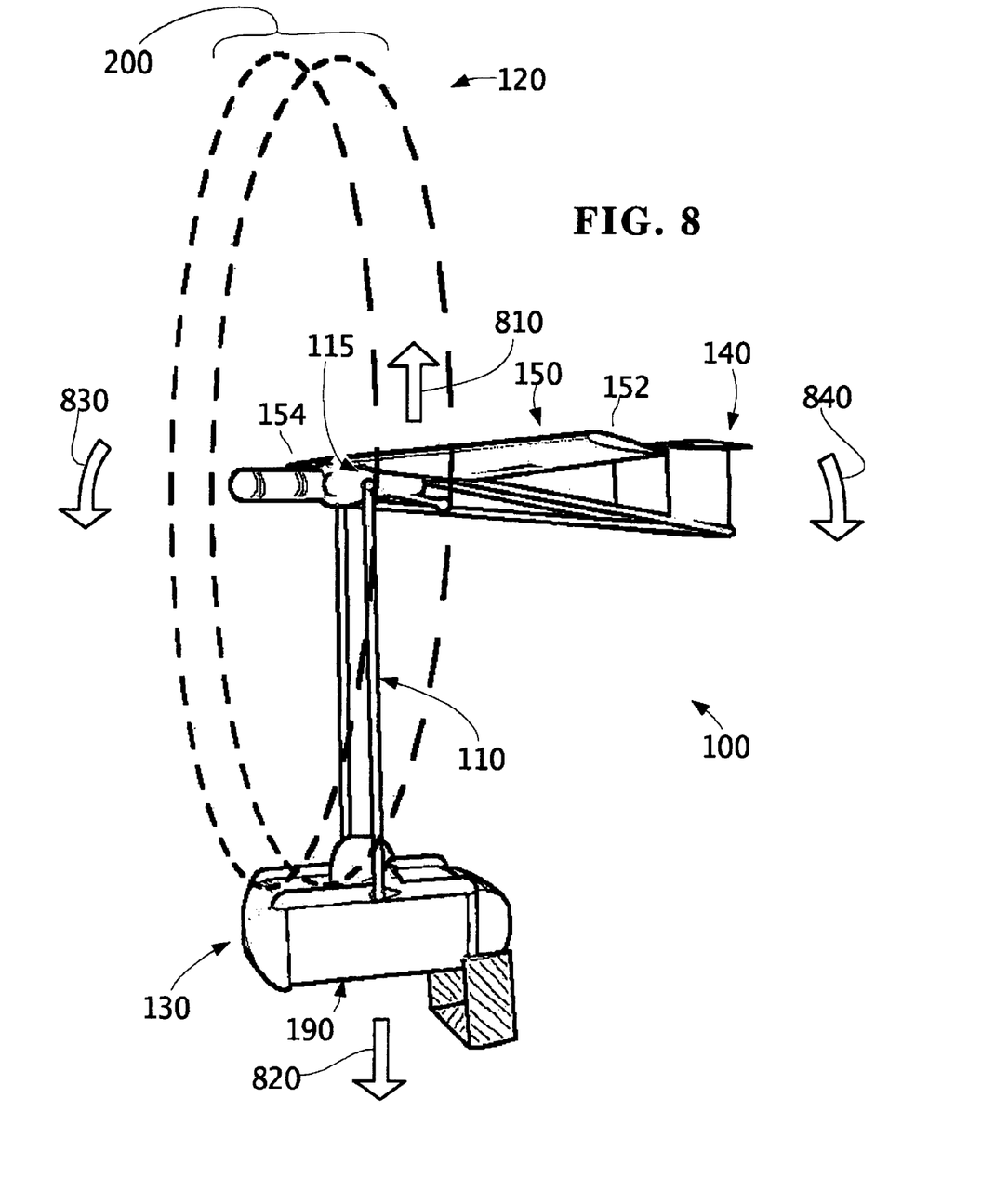
FIG. 8 is a perspective view of the flying craft of FIG. 1 during operation of the lift unit in a horizontal mode of flight with the payload of FIG. 6 in transit.

Exemplary payload unit 130 further includes: a roof 132 with fairings 131 on each side; a crew compartment 134; upper truss members 136; lower truss members 135; a forward end cap 138; an aft end cap 139; and a payload stabilizing structure 133. The weight of a 20-foot standard cargo container is carried from the four corners of its base, through the lower truss members 135, to the upper truss members 136, and up through the suspension structure 110 (FIGS. 6–8). Crew compartment 134 includes a dear canopy for pilot visibility and suitable seating, controls, and environmental comfort systems (not shown) for one or more crew members. Truss members 135 and 136 can fold upward and into fairings 131 in the underside of roof 132 when not in use.

Some of the many possible alternative embodiments that can be constructed and operate according to various aspects of the invention include unmanned flying craft of any suitable size (e.g., smaller than a typical human), manned or unmanned flying craft dimensioned to carry more than one cargo container as payload, flying craft configured to carry a number of passengers, and flying craft containing a payload that is an integral part of its payload unit or carried inside an enclosure of the payload unit.

An exemplary method for flying craft 100 to transport payload 190 may be better understood with reference to the sequence of FIGS. 3-4-5-6-7-1-8.

FIG. 3 illustrates flying craft 100 (with a partially cutaway view of wing panel 152) before any flight takes place in the exemplary method. Sets 310, 320 of latchable pivot couplings are mounted between the blades of sets 210, 220, respectively, and hub 126 so that the blades can orient parallel to tailboom 140 for the compact stowage configuration illustrated. In an exemplary configuration, rotor 200 (FIG. 2) has a radius of about 40 ft. while tailboom 140 and suspension structure 110 each have a length of about 40 ft. The benefit of these dimensions is apparent when it is noted that craft 100 rests in a diagonal "corner-to-corner" orientation on a standard naval weapons elevator 330 measuring 44 by 50 ft. Lift unit 120 rests on the support surface (elevator 330) alongside payload unit 130, and is held upright by tailboom 140, which is pivotally latched to the payload unit 130.

Another benefit arises from the radius of rotor 200 being slightly less than the length of suspension structure 110. In that case, the rotor can advantageously mount close to the pivotal coupling (nacelle 128). As illustrated in FIG. 8, in that case, operating rotor 200 sweeps nearly the largest possible area, and thus has the greatest possible efficiency, without tips of the rotor blades hitting payload unit 130 in a horizontal mode of flight.

FIG. 4 illustrates flying craft 100 after deployment from the stowed configuration of FIG. 3 but with lift unit 120 not yet operational, still supported by landing gear 229 and held upright by tailboom 140. Blades 212, 214, 216 and blades 222, 224, 226 are fully deployed, the blades of each set extending equispaced about hub 126. As would be expected for a counter-rotating coaxial rotor, blades in the two sets have opposite chord profiles, an example of which FIG. 4 illustrates with blades 214, 220. Wing panels 152, 154 hang from their pivotal attachments to central airfoil 141 at their lowest gravitational potential. Payload stabilizing structure 133 is tilted rearward, ready to hang down at the back of payload unit 130 to stabilize it during horizontal flight.

Figure 5:
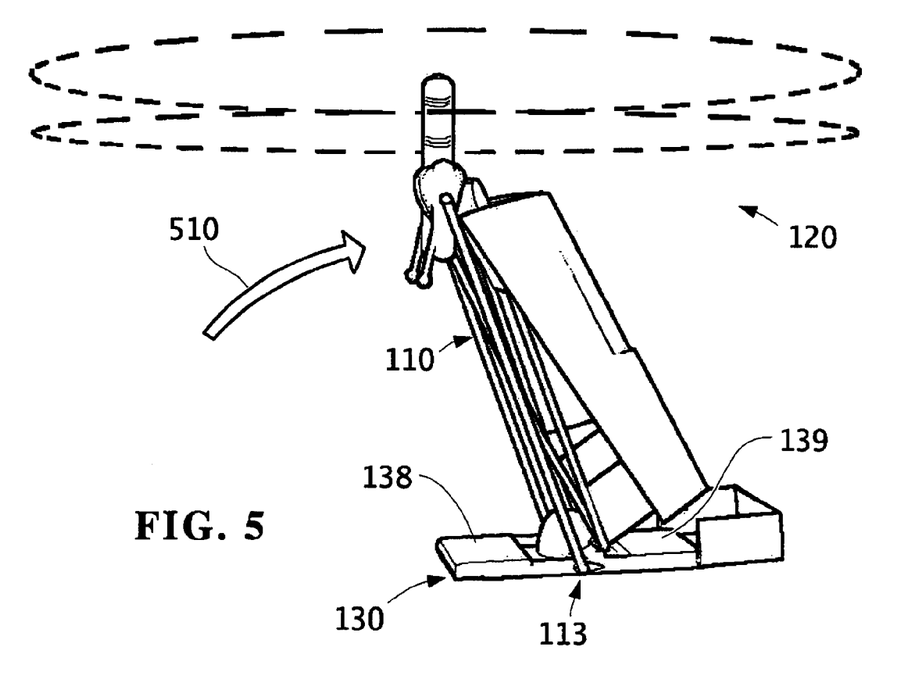
FIG. 5 is a perspective view of the flying craft of FIG. 1 during initial operation of the lift unit.

The method of operation of flying craft 100 proceeds, as may be better understood with reference to FIG. 5, with lift unit 120 moving away from support surface 420 and about payload unit 130 in an arc 510 until it begins to suspend payload unit 130. This initial motion of lift unit 120 is made possible in the exemplary embodiment by pivotal coupling between payload unit 130 and end 113 of suspension structure 110 and pivotal coupling between tailboom 140 and lift unit 120. When tailboom 140 is latched to payload unit 130 during this motion, as is preferred, tailboom 140 contributes to the structural integrity of the mechanical connection between lift unit 120 and payload 130 as lift unit 120 moves in arc 510. (The overall structure is akin to a parallelogram.)

FIG. 6 illustrates flying craft 100 hovering above payload 190 with lift unit 120 operating in the vertical mode, generating a predominantly gravity-countering aerial motive force. Tailboom 140 is suitably latched to payload unit 130 in a substantially vertical orientation. The deviation of tailboom 140 from vertical is only about five degrees in the configuration of FIG. 6. In this configuration, tailboom 140 can cooperate with suspension structure 110 to support any forces of lift unit 120 that push down on or shear across payload 190 when craft 100 descends onto it. At that point, upper support trusses 136 rotate to extend from recesses in roof 132. When payload unit 130 is to contact a sensitive external load such as containerized fuel, both flying craft 100 and the external load can be grounded before payload unit 130 contacts the load.

In an alternative method, craft 100 can rest on or suspend from a suitable support before taking off, in a position similar to that shown in FIGS. 4–6, allowing payload 190 to be mounted on payload unit 130 before craft 100 begins flight. FIGS. 27–32, 41–45, and 50–52 of the '348 application illustrate examples of such structure.

End caps 138, 139 include aerodynamic streamlining structure suitable for the fore and aft ends, respectively, of payload 190. Any structure suitable for decreasing wind resistance of payload 190 during horizontal flight of flying craft 100 can be employed. For example, end caps 138, 139 can be fabricated from elastic sheets reinforced by internal ribs. Alternatives include inflatable structures filled with compressed air from an internal pump or ambient air collected in a way that exploits pressure differential between moving and still fluid bodies.

Any suitable type of fastener can be employed to latch a tailboom to a payload unit in accordance with various aspects of the invention. Such a fastener can be located near the end of the tailboom, making mechanical connection directly to the payload unit. Alternatively, the fastener can be at or near a pivot point between the tailboom and payload unit. As may be better understood with reference to FIGS. 9A and 9B, flying craft 100 employs a faster 900 at the aft end of crew compartment 134 on payload unit 130.

Fastener 900 includes an overhanging pedestal 910, which can attach with suitable fasteners, integral construction, etc. to (1) roof 132 of payload unit 130 (FIG. 2) at bottom 912 of pedestal 910, or (2) the aft end of crew compartment 134 at back side 914 of pedestal 910, or (3) both. Pedestal 910 supports a cam 920 that is ratchet-mounted on a shaft 930, which mounts athwart payload unit 130. Cam 920 readily moves clockwise, from the orientation illustrated in FIG. 9A (nubs extending downward and aft) to the orientation illustrated in FIG. 9B (nubs extending forward and downward). A ratchet (not shown) prevents cam 920 from moving counterclockwise except when a suitable actuator (not shown) releases cam 920.

Figure 9A:
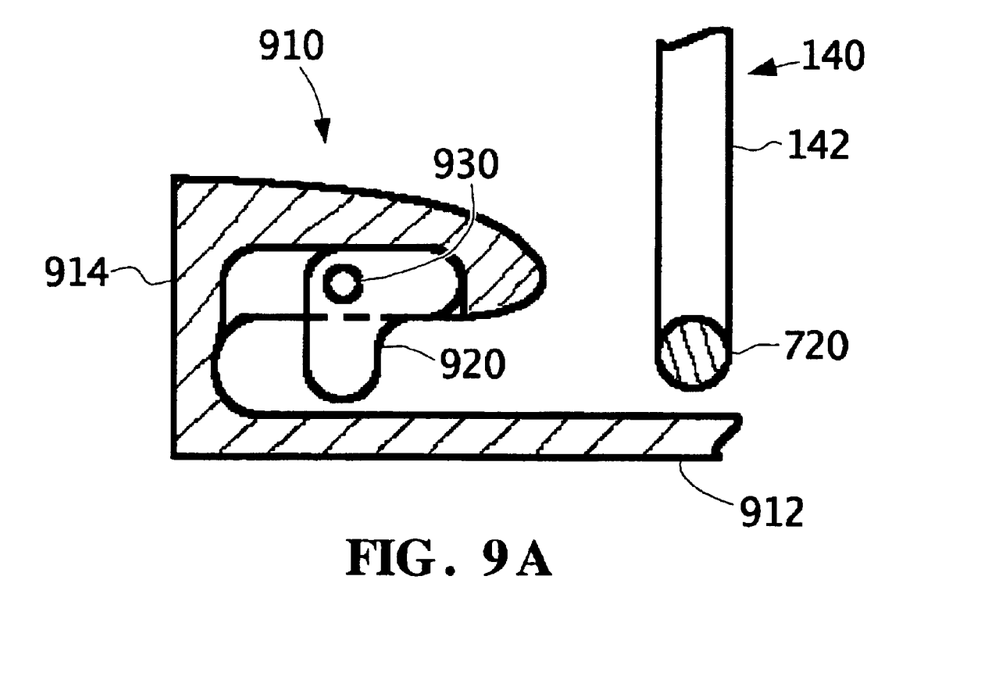
FIGS. 9A and 9B is a cut-away side view of a fastener on the payload unit of the flying craft of FIG. 2 with the tailboom latched to, and released from, the payload unit.
Figure 9B:
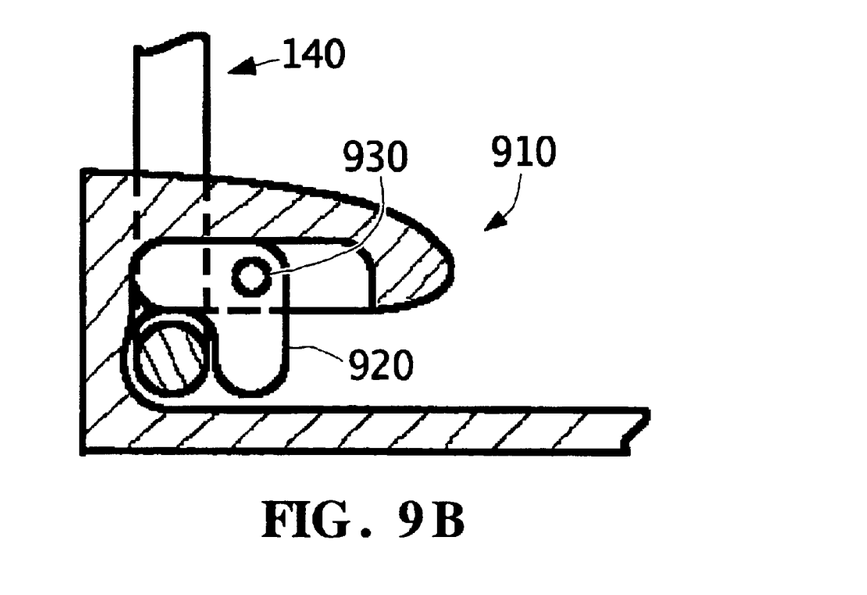

As illustrated FIG. 7, the bottom end of tailboom 140 includes a crosspiece 720 that connects aft ends of empennage booms 142, 144 together. In latching operation of fastener 900, as illustrated in the sequence of FIGS. 9A–9B, crosspiece 720 pushes cam 920 in a clockwise direction and secures between a downward-pointing nub of cam 920 and an interior wall of pedestal 910. When thus secured, crosspiece 720 keeps tailboom 140 latched to payload unit 130. An actuator (not shown) can release cam 920, under computer or operator control, to rotate counterclockwise about shaft 930 and release tailboom 140 from payload unit 130, thereby allowing tailboom 140 to pivot independently of payload unit 130.

Regardless of the particular type of fastener employed, latching the tailboom to the payload unit fixes it in an orientation substantially parallel to suspension structure 110. This configuration prevents the tailboom from repeatedly banging against the payload unit during lateral movements of the flying craft. It also permits suspension structure 110 and tailboom to mechanically cooperate in supporting forces of the lift unit when the tailboom is resting on a surface. Furthermore, with a forward center of gravity in payload 190, pivotally latched tail 140 is pushed up towards lift unit 120. A limit on forward center of gravity of an acceptable payload can be imposed to assure sufficient rotor pitch-up control authority in vertical flight mode, balancing the nose-down moment produced by pivotally latched tailboom 140.

Figure 10A:
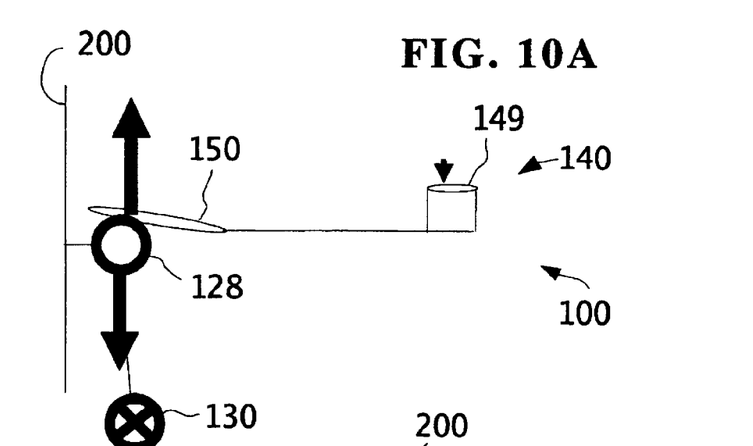
FIGS. 10A, 10B, and 10C, is a schematic side view of the flying craft of FIG. 1 during horizontal flight and two stages of transition to vertical flight.
Figure 10B:
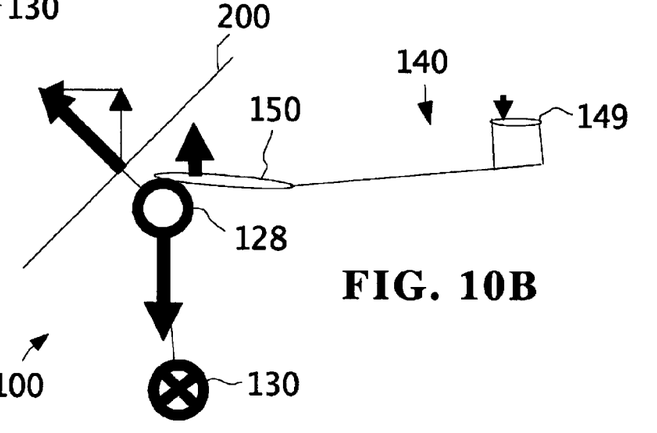
Figure 10C:
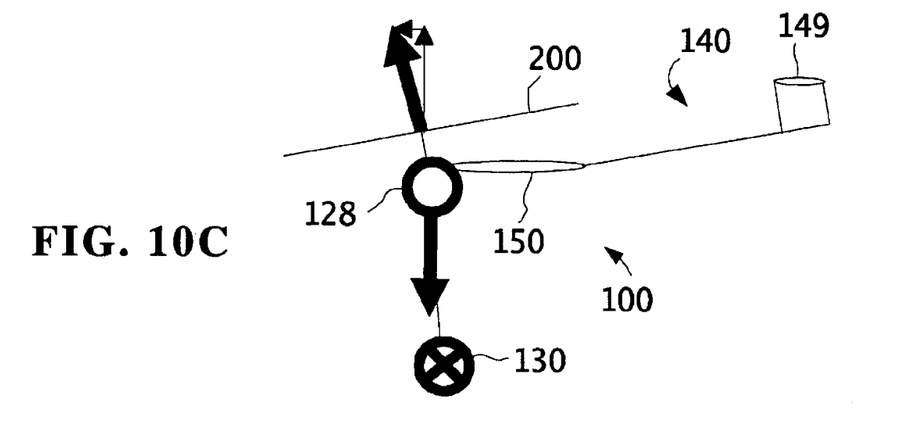

When the tailboom is not latched to the payload unit, it can be left free to rotate, within an angular range, about a rotational axis that is orthogonal to an axis passing through the first and second ends of suspension structure 110. Exemplary lift unit 120 includes an actuator (not shown) that is coupled via tilt boom 143 to pivot tailboom 140 with respect to nacelle 128. As may be better understood with reference to FIGS. 11–13. Another benefit of pivotal coupling between tailboom 140 and lift unit 120, discussed below with reference to the sequence of FIGS. 10A-10B-10C, is that an actuator (not shown) at the couple can effect tilt of rotor 120 and initiate a transition from horizontal to vertical flight.

As discussed above with reference to FIG. 10C, flying craft 100 can move horizontally even in a vertical mode of flight, though not with the efficiency and speed of horizontal flight mode. For example, FIG. 7 illustrates flying craft 100 in a vertical mode of flight with payload 190 attached to payload unit 130, and with craft 100 moving horizontally at a modest speed. During the vertical mode of flight, tailboom 140 can hang from lift unit 120 in an orientation substantially parallel to suspension structure 110, as illustrated in FIG. 6. This configuration minimizes resistance to downwash from lift unit 120.

Payload stabilizing structure 133 hangs down at the aft end of payload unit 130, in a position to interact with an airstream resulting from forward motion of craft 100 (represented by arrow 710) and thus stabilize pitch and yaw of payload unit 130, e.g., as discussed below. The airstream also pushes back (a) tailboom 140, which at this point may freely pivot with respect to payload unit 130, and (b) wing panels 152, 154 of aerodynamic lift structure 150, which thus begin to assume an operating position extending substantially orthogonal from tailboom 140. Advantageously, no actuator is needed to move wing panels 152,154 into position, though one can be employed if desired.

FIG. 1 illustrates flying craft 100 during transition between the vertical mode of flight illustrated in FIG. 7 and the horizontal mode of flight illustrated in FIG. 8. At this point, aerodynamic lift structure 150 is fully in its operating position and is developing a substantial portion of the lifting force generated by lift unit 120. In a particular example, horizontal speed at transition is about 122 knots.

FIG. 8 illustrates flying craft 100 in a fully horizontal mode of flight. In this mode, aerodynamic lift structure 150 efficiently generates most of the lifting force from lift unit 120 to keep craft 100 airborne. Except for minor upward force from any slight upward pitch of lift unit 120, rotor 200 serves strictly as a horizontal propulsion device to (a) pull aerodynamic lift structure 150 through the air so that structure 150 can generate lift and (b) move flying craft 100 to its destination. In a particular example, horizontal speed in horizontal flight mode is about 312 knots.

As discussed above, lift unit 120 couples to suspension structure 110 pivotally around bearings (not shown) at upper end 115 of suspension structure 110. Consequently, lift unit 120 can assume either a vertical or horizontal orientation. Flying craft 100 can thus operate in a vertical mode of flight in which lift unit 120 generates a vertical aerial motive force predominantly opposing gravity, or a horizontal mode of flight in which lift unit 120 generates an aerial motive force predominantly parallel to the ground. FIG. 1 illustrates flying craft 100 in a transition between the two modes.

During the vertical mode of flight, tailboom 140 can be substantially orthogonal to suspension structure 110, as illustrated in FIG. 8. In that configuration, tailboom 140 extends rearward in an orientation where it can develop pitching and yawing moments to control and stabilize horizontal flight and where it can counteract a moment produced by aerodynamic lift structure 150.

A tailboom according to various aspects of the invention includes any structure suitable for interacting with an airstream at one end to develop a moment about an opposite end. Interaction with an airstream can take place passively, with movable control surfaces or fixed airfoils. Alternatively or in addition, airstream interaction can employ one or more active generators of aerial motive force, e.g., a tail rotor. As may be better understood with reference to FIG. 2, for example, tailboom 140 is of a type that employs vertical stabilizers with rudders and a horizontal tail to passively interact with an airstream, which results from downwash produced by rotor 200 or horizontal flight of craft 100, or both.

A control surface according to various aspects of the invention includes any stabilizer, aileron, elevator, rudder, tail, or trimming device that can be suitably employed to influence roll, pitch, or yaw of a flying craft. For example, tailboom 140 includes vertical stabilizers 146, 148 with rudders 145, 147 and a horizontal tail 149 mounted atop vertical stabilizers 146, 148. Tail 149 has an elevator 410 (FIG. 4) with a 30% chord partially spanning it. Tailboom 140 further includes two empennage booms 142 (FIG. 2) and 144 (FIG. 4) to which vertical stabilizers 146, 148, respectively, are attached.

The operation of tailboom 140 to counteract moment produced by aerodynamic lift structure 150 may be better understood with reference to FIG. 8, which illustrates flying craft 100 in horizontal flight. Wings 152, 154 of aerodynamic lift structure 150 (best seen in FIG. 2) generate lift due to forward motion of craft 100, which results from aerial motive force from lift unit 120 that is predominantly parallel to the ground (not shown). As with the aerial motive force that lift unit 120 generates in hover, lifting force from aerodynamic lift structure 150 can be viewed as a vertical vector 810 passing through a point herein called the "center of lift." This point is displaced slightly aft of end 115 of suspension structure 110, where lift unit 120 pivotally couples to suspension structure 110.

The weight of payload unit 130 with captured payload 190 imparts a downward force 820 on suspension structure 110, which lifting force from aerodynamic lift structure 150 opposes to keep craft 100 airborne. The horizontal displacement between the center of lift from structure 150 and the pivot point of end 115 of suspension structure 110 results in a moment 830 about the point, which acts to pitch craft 100 downward.

Elevator 410, located on horizontal tail 149 of tailboom 140 and illustrated in FIG. 4, can orient slightly upward or downward (e.g., plus or minus 20 degrees) with respect to tail 149. To counteract the downward-pitching moment from aerodynamic lift structure 150, elevator 410 can orient upward and interact with the airstream resulting from forward motion of craft 100 to develop an opposing, upward-pitching moment 840.

As may be better understood with reference to the sequence of FIGS. 10A-10B-10C, flying craft 100 can employ an actuator (not shown) at the pivotal couple (not shown) between tailboom 140 and nacelle 128 to tilt rotor 200 and transition from a horizontal mode of flight (as in FIGS. 8, 10A) to a vertical mode of flight with some horizontal velocity (as in FIGS. 7, 10C). During the horizontal mode of flight (FIG. 10A), tail 149 of tailboom 140 advantageously interacts with the airstream from horizontal motion of flying craft 100 to counteract a downward-pitching moment from aerodynamic lift structure 150 with an upward-pitching moment of its own, as discussed above.

To initiate a transition to vertical flight mode, the actuator applies a counterclockwise (from the observer of FIG. 10B's perspective) moment to tailboom 140 relative to nacelle 128 while elevator 410 (FIG. 4) adjusts slightly to increase its upward-pitching moment. The result is that tailboom 140 maintains its orientation with respect to the ground (not shown) and nacelle 128 rotates clockwise with respect to tailboom 140, bringing rotor 200 into a vertical orientation. As illustrated in FIG. 10C, flying craft 100 can move in a horizontal direction in vertical flight mode with rotor 200 tilted slightly forward and tailboom 140 trailing behind where tail 149 can influence pitch and rudders 145, 147 (FIG. 2) can influence yaw.

In the schematic view of FIG. 10, nacelle 128 can also be understood as the center of gravity of craft 100. The aerial motive force normal to the plane of rotor 200 passes through this center of gravity. Nacelle 128 is preferably locked under aerodynamic lift structure 150 when wing panels 152, 154 (FIG. 2) are at 10% mean aerodynamic chord.

Advantageously, payload unit 130 imparts lateral stability to flying craft 100 by suspending from lift unit 120 with rotation restricted about one axis. In this suspended configuration, payload 190 increases the moment of inertia in the plane that includes parallel members 112, 114 (FIG. 2). As a result, suspended payload 190 increases stability about the axis normal to that plane.

The force of gravity tends to position payload unit 130 beneath lift unit 120, which lowers the center of gravity and increases pendular stability. This behavior conforms to accepted aircraft design theory, which holds that pendular stability (also known as lateral stability or roll stability) increases for "high wing" airplanes having a low center of gravity. Contrary to some conventional teachings, enhancement of pitch stability of lift unit 120 is not primarily due to the addition of suspension structure 110 and payload unit 130. Instead, the mass of payload unit 130 is believed to behave in pitch like a point mass at the axis of rotation. Pitch stability and control of lift unit 120 are thus unaffected by the addition of suspension structure 110 and payload unit 130, while roll or pendular stability in horizontal flight (FIG. 9) and yaw stability in vertical flight (FIG. 8) increase.

Various particular features of exemplary flying craft 100 may be better understood with reference to the labeled paragraphs below. In variations where the benefits of these particular features are not required, they may be suitably omitted or modified while retaining the benefits of the various aspects of the invention discussed above. With possible exceptions, structural elements not introduced with a reference numeral are not illustrated in the drawings. Those structural features referenced by number are illustrated in FIG. 2 unless otherwise indicated.

PAYLOAD UNIT—Payload unit 130 is optimized to capture and streamline exemplary payload 190, which is a 20-foot MILVAN container. Payload unit 130 can be reconfigured in flight to capture and partially streamline a 40-foot ISO container. A winch is located below crew compartment 134 for attaching slung cargo. A special MILVAN with containerized fuel, fuel pump, and streamlined bottom can be provided for a self-deployment ferrying operation. The aircraft portion of a recovery assist system is located on either side of payload unit 130 at suspension structure 110 attachment points. Payload unit 130 may also be operated without having an external load.

CREW COMPARTMENT—Crew compartment 134 holds one pilot, having dimensions of 4 foot height, 4 foot depth, and 3 foot width. The entire monocoque crew compartment is mounted to payload unit 130 by oleo struts for shock absorption upon landing, and can be jettisoned for emergency egress including parachute recovery with positive buoyancy for ocean recovery. Crew compartment 134 then becomes a self-contained recovery module. Provisions for a remote co-pilot are also provided.

GENERAL FLIGHT CONTROLS—Flying craft 100 permits single pilot operation from either crew compartment 134 or a remote operator's console. Control moments are generated by means of rotor and fixed surface controls, with rotor cyclic control phased out as craft 100 converts from a vertical to a horizontal mode of flight. The conversion and power management systems are designed for straightforward cockpit procedures. All normal and emergency procedures can be controlled by a single pilot.

COCKPIT CONTROLS—The cockpit controls include a longitudinal/lateral stick, a collective-type power lever, and pedals for both the pilot and the remote operator. The throttles contain levers that control flaps 155, 156 and a blade-pitch governor hand-wheel for manual override of the rotor governor. A three-position switch on the power lever controls the nacelle conversion angle.

ROTOR CONTROLS—In vertical flight mode, pitching moments arise from application of longitudinal cyclic pitch change to blades of rotor 200, and rolling moments from applying lateral cyclic pitch change. Upward or downward movement of the power lever simultaneously increases or decreases engine power and rotor blade collective pitch to provide vertical thrust control. Differential rotor collective pitch generates yawing moments in vertical flight mode and rolling moments in horizontal flight mode.

FIXED CONTROLS—Elevator 410 (FIG. 4) is active in all flight modes. During conversion from a vertical to a horizontal mode of flight, the desired control response is achieved by phasing out the cyclic pitch control as aerodynamic lift structure 150 offloads the rotor, and by phasing differential collective from pedal control to the lateral stick control. Wing panels 152, 154 have partial span flaps 155, 156, respectively, for increased lift during conversion.

FLIGHT MODE CONVERSION—The conversion system is mounted to the gearbox and active only during conversion between vertical and horizontal flight modes. The system engages with tilt boom 143 to pull nacelle 128 underneath aerodynamic lift structure 150 for horizontal mode, or to gradually release nacelle 128 for vertical mode. The force is provided by redundant linear actuators having hydraulic motors and electrically-powered servo valves. The conversion system disengages with tilt boom 143 when not active. In the event of conversion system failure, an automatic mechanical damper temporarily engages with tilt boom 143 to modulate movement of nacelle 128 into vertical mode.

POWER MANAGEMENT—A power management cockpit control consists of a pair of throttles and a power lever. The collective stick-type power levers are located to the left of the pilot and have the same sense of motion as a conventional helicopter collective stick. Following engine start and checkout, each throttle lever is hooked to the power lever. Then, in vertical flight mode, power lever motion simultaneously changes the power setting of the rotors. In horizontal flight mode, however, the power lever only controls power setting of the engines as the collective pitch input is phased out as a function of nacelle tilt angle. In addition, power management is simplified by the automatic inputs of a rotor collective pitch governor which adjusts to maintain the rotor rpm selected by the pilot.

POWER PLANT—Two Rolls-Royce AE 1107 turboshaft engines and a co-axial gearbox are located in nacelle 128, which is of the centerline type. The co-axial gearbox provides function similar to the gearbox in the Kamov Ka-32A helicopter. Total engine rating is 12,300 HP and transmission rating is 10,209 HP.

PAYLOAD UNIT YAW STABILIZATION SUBSYSTEM—Yawing sensors are mounted to suspension structure 110 to provide control information. A feedback loop converts yawing strain on suspension structure 110 into a correcting moment at rudders of payload stabilizing structure 133, thereby aligning payload unit 130 with lift unit 120 and preventing yaw divergence. The pilot may override the yaw stabilization subsystem with pedal control, or disable it at lower airspeeds with well-behaved external loads.

LIFT UNIT GUST AND LOAD ALLEVIATION SYSTEM—During ground mode operations, lift unit 120 is automatically controlled to minimize stress on latched tailboom 140. Strain sensors mounted on payload unit 130 at the latching fastener measure roll and yaw moments exerted by payload unit 130 on tailboom 140. A feedback loop to the rotor controls creates an equivalent moment at rotor 200, releasing strain from tailboom 140. For high sea states with a rolling deck, rotor 200 follows the rotation of grounded payload unit 130 without stressing tailboom 140. The pilot may disable lift unit 120 gust and load alleviation system for light external loads, or for calm air with a stable deck.

ROTOR RPM GOVERNOR—The rotor RPM governor can be used in all modes to simplify power management. It is a closed loop system that maintains a pilot-selected RPM by controlling collective blade pitch. In vertical flight mode, the collective pitch inputs from the RPM governor are superimposed on the collective pitch inputs from the power lever and the differential collective pitch inputs from the control stick. In horizontal flight mode, the primary collective pitch input comes from the RPM governor as required to maintain pilot selected RPM. This results from the fact that during transition the collective pitch inputs from the power lever are phased out, and only a small amount of differential collective pitch inputs from the control stick are retained in horizontal flight mode for roll control. The pilot can manually override the RPM governor.

FUEL SYSTEM—Fuel is supplied to the engines by a lightweight, crash resistant, 4,000 pound capacity fuel cell contained in fixed central airfoil portion 141. Gravity refueling is accomplished through a filler cap. External fuel is supplied by a special 24,000 pound fuel capacity MILVAN shaped container. Redundant, electrically driven boost pumps located at the lowest point of the container deliver fuel up through a hose in the left side of suspension structure 110 to a fuel cell in engine nacelle 128. Alternatively, fuel may be pumped using ambient air collected in a way that exploits pressure differential between moving and still fluid bodies. The interface between the special MILVAN and payload unit 130 has quick release fuel connections and quick release electrical connections. The hose in suspension structure 110 has pivoting connections on both ends to allow free pivotal movement at nacelle 128 and at payload unit 130.

HYDRAULIC SYSTEM—Flying craft 100 has three independent transmission driven hydraulic systems. The pump for each system is geared to the rotor side of the transmission clutch so that full hydraulic power can be provided with both engines shut down, as long as the rotors are turning within the normal speed range. The hydraulic systems power the cyclic control, collective control, RPM governor, elevator, and heat exchanger blower.

ELECTRICAL SYSTEM—The electrical system consists of dual DC and AC electrical subsystems with sufficient capacity to accommodate peak load requirements with one engine out. A battery is connected to each DC bus during normal operation. The batteries provide self-contained engine-start capability. DC power is delivered to payload unit 130 through a distribution bus within the right side of suspension structure 110. AC power at payload unit 130 is supplied by two solid-state inverters.

ENVIRONMENTAL CONTROL SYSTEM—The environmental control system provides heating, ventilation, air conditioning, window defogging, and crew breathing oxygen for crew compartment 134. Heating is provided by electric powered heaters. An ambient air-inlet valve enables the introduction of unconditioned air for fresh air ventilation of crew compartment 134. An electrically powered inlet fan provides the required airflow at all flight conditions. Noise and vibration control structure or equipment can be included as desired.

MONOCOQUE STRUCTURES—Wing panels 152,154, vertical stabilizers 146,148, rudders 145, 147, horizontal tail 149, elevator 410 (FIG. 4), and payload stabilizing structure 133, and crew compartment 134 are of conventional monocoque construction. Booms 142, 143, 144 are made of rigid tubular metal. Suspension structure 110 is made of high tensile strength composites. Payload unit 130 has high tensile strength upper and lower truss members 136, 135 for holding payload 190 (FIG. 6) and lightweight aerodynamic end caps 138,139 for enveloping payload 190 in a streamlined shape.

LANDING GEAR—Payload 190 provides its own landing gear. When no load is attached, payload unit 130 supports itself without any special landing gear requirements. Nacelle 128 includes biped landing gear 127 which provides support in rest mode and absorbs shocks in the event of gusts or deck movement while near rest mode. Each leg is rated to support 15,000 pounds.

TAIL BOOM AND SUSPENSION STRUCTURE LATCHES—During ground mode and vertical flight mode, tailboom 140 is latched to payload unit 130 at fastener 910 (FIGS. 9A, 9B). Transition to forward flight, i.e., horizontal flight mode, begins with shaft 720 released from fastener 910 and tailboom 140 free to rotate with the airstream. When not engaged, fastener 910 reverts to a capture state, as illustrated in FIG. 9A. In the reverse transition from horizontal to vertical flight mode, fastener 910 recaptures tailboom 140. Suspension structure 110 can freely pivot with respect to payload unit 130 at bearings 137 (FIG. 2), but its angle with respect to payload unit 130 can be fixed when shaft 720 is released and freed again when the tail latching engages.

PAYLOAD UNIT—Payload unit 130 is comprised of load carrying members and aerodynamic members. Pivoting support trusses 136, 136 carry the load from the lower corners of the ISO container (payload 190 of FIG. 6) to suspension structure 110. The aerodynamic members are the roof 132, payload stabilizing structure 133, sides, and end caps 138, 139. End caps 138, 139 have a pivotal attachment to the lower end of lower truss members 135, and a screw jack attachment to roof 132. As the screw jack rotates, the end cap translates over the roof edge and rotates upper support truss members 136. Each one of end caps 138, 139 has latches for holding the ISO container corners. The jack screws and latches are electrically actuated. Accordion siding can unfold with the rotating support truss members 136. In operation (FIG. 6), flying craft in vertical flight mode lowers payload unit 130 onto payload 190. Then the screw jacks rotate to lower end caps 138, 139, truss members 135, 136, and siding onto payload 190. Latches hold end caps 138, 139 and members 136 to the corners of the ISO container. After the container is secure, craft 100 lifts and transitions to cruise, i.e., horizontal flight mode (FIG. 8), as end caps 138, 139 inflate to a streamlined shape. Flying craft 100 carries payload 190 to its destination and reverses the operation to release payload 190 and rotate end caps 138, 139 into a horizontal position for the return flight. Payload unit 130 may be reconfigured in flight to accommodate either a 20-foot or a 40-foot ISO container. Truss members 135 and 136 overlap one another may be extended or retracted in flight. For oversize load operations, a cargo net may be snugged up to the payload unit 130 by the integrated wench. The aircraft portion of the recovery assist system deploys two messenger cables from either side of payload unit 130 at end 113 of suspension structure 110 (attachment points) for recovery onto a container or down to the deck of a ship. Flying craft 100 may self-deploy using a special streamlined MILVAN fuel container.

ROTOR—Disk area of rotor 200 is 5,026 square feet. In vertical flight mode, the rotor disk plane is parallel with the roof 132 of payload unit 130. In horizontal flight mode, the rotor centerline is fixed at 10 degrees below centerline of aerodynamic lift structure 150, thus providing axial thrust with wing panels 152, 154 near maximum lift coefficient. In horizontal flight, the tips of blades in sets 210, 220 should clear payload unit 130 by about 1.5 feet. The tips of blades in set 210 and should clear wing panels 152, 154 by about nine feet.

STRUCTURAL CONFIGURATION AND MATERIALS—The entire aft (again, only in a particular embodiment) has a maximum gross weight of about 74,000 pounds. Three important structural components are the booms 142, 143, 144, tailboom 140 as a whole, and suspension structure 110. Tailboom 140 provides structural support during take-off and landing. During transition from rest mode to grounded vertical flight mode, tailboom 140 is latched to payload unit 130. Suspension structure 110 provides tensile support in opposition to the compressive support of tailboom 140, which together form a rigid cantilever arm about the roll axis to absorb rolling and yawing moments due to wind gusts or ship deck movement. Suspension structure 110 provides sufficient tensile strength to support a 37,000 pound payload in vertical flight mode at 150 knots, and support a 30,000 pound payload in horizontal flight mode at 350 knots with appropriate safety margin. The tilt boom has sufficient tensile strength to pull the gearbox underneath the wing during transition to horizontal flight mode, and sufficient rigidity in combination with the booms 142, 143, 144 to prevent rotor whirl-induced tail flutter.

Payload unit 130 has trusses 135, 136 of sufficient tensile strength to hold a 40-foot ISO container weighing 37,000 pounds, and sufficient toughness to withstand the impact of lowering the container onto a sea state 5 deck. In horizontal flight mode, fixed central airfoil portion 141 locks down to both the gearbox and folding wing panels 152, 154 for increased structural integrity.

AUTOROTATION—Rotor 200 has low disk loading and thus can be operated in autorotation mode for reduced descent rate emergency landing. In the event that all power is lost, flying craft 100 can automatically revert to autorotation mode. Blades 212–226 of rotor 200 revert to autorotation pitch, a failsafe conversion damper engages, locks of wing panels 152, 154 release, and elevator 410 (FIG. 4) rotates up. The oleo struts supporting crew compartment 134 and supporting biped landing gear 127 can be fabricated to withstand the autorotation sink rate at design gross weight.

ENGINE SAFETY—Blade sets 210, 220 are driven by center mounted engines of proven high reliability. A co-axial gearbox connecting the pair of engines to the pair of blade sets 210, 220 allows either engine to power both blade sets in the event of an engine failure. Overrunning clutches in the engine speed reduction gearing can automatically disconnect a failed engine from the drive system, thus allowing the effective use of available power. Single engine performance, stability, and control are similar to two engine operation at low power settings because of the co-axial gearbox in nacelle 128. Horizontal flight mode and transition can be performed as normal, but single engine hover (vertical flight mode) is then limited to low payload weights. The conversion mechanism is simple and engages natural aerodynamic forces. In the event of complete loss of power, conversion from horizontal to vertical flight mode with autorotation is automatically achieved.

SYSTEM SAFETY—Appropriate levels of hydraulic system and electrical system redundancy and safety are included in the design of the aircraft. A pilot caution and warning system can provide visual and/or audible indications of detectable system malfunctions, such as hydraulic system pressure loss, rotor control discrepancies, engine fire, latch failure, etc. Instrumentation will be incorporated to monitor loads and positions at critical locations (such as control linkages, control surfaces, etc.) during flight.

Other particular features of exemplary flying craft 100 and variations in the better understood with reference to the contents of www.baldwintechnology.com, which is incorporated herein by reference.

PUBLIC NOTICE REGARDING THE SCOPE OF THE INVENTION AND CLAIMS

The inventor considers various elements of the aspects and methods recited in the claims filed with the application as advantageous, perhaps even critical to certain implementations of the invention. However, the inventor regards no particular element as being "essential," except as set forth expressly in any particular claim. For example, a claim calling for an aerodynamic lift structure but not for pivotally coupled wing panels reads on flying craft employing any suitable type of aerodynamic lift structure (e.g., single fixed wing, fabric free wing) regardless of whether the system employs such wing panels or not.

While the invention has been described in terms of preferred embodiments and generally associated methods, the inventor contemplates that alterations and permutations of the preferred embodiments and methods will become apparent to those skilled in the art upon a reading of the specification and a study of the drawings. For example, a hub employing a pair of blade pitch control rods surrounding a central shaft, or other open structure, can substitute for hub 126 of FIG. 2.

Additional structure can be included, or additional processes performed, while still practicing various aspects of the invention claimed without reference to such structure or processes. For example, a rotor can be of a "variable geometry" type that works well in both vertical and horizontal modes of flight, as disclosed in published U.S. patent application Serial No. 2002/0098087 filed Jan. 23, 2001 by Yuriy and in U.S. Pat. No. 6,019,578 issued Feb. 1, 2000 to Hager et al. and U.S. Pat. No. 6,578,793 issued Jun. 17, 2003 to Byrnes et al., all of which are incorporated herein by reference. (Patents and patent applications incorporated herein by reference may themselves incorporate documents by reference, and such documents are also incorporated herein by reference.) Another example of a "variable geometry" rotor employs blades having multi-element airfoils. The blades include flaps that can extend from to increase surface area during slower vertical-mode operation and retract to permit efficient high-velocity operation in horizontal flight mode, where the rotor is called upon to generate efficient axial thrust. Furthermore, wing panels 152, 154 may be removed to lighten the lift unit and increase payload weight for short haul flights in vertical flight mode.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim.

In addition, aspects of the invention are particularly pointed out in the claims using terminology that the inventor regards as having its broadest reasonable interpretation; the more specific interpretations of 35 U.S.C. § 112(6) are only intended in those instances where the terms "means" or "steps" are actually recited. For example, the term "ground" is broadly used herein to indicate a portion of the earth's surface (or, conceivably, the surface of an extraterrestrial body) that is beneath a flying craft, regardless of whether the surface is actually dry land or a body of water. As another example, the term "orthogonal" is used to indicate that two structures are oriented substantially 90° from each other, without requiring an exactly perpendicular orientation or intersection of any axes of the structures.

The words "comprising," "including," and "having" are intended as open-ended terminology, with the same meaning as if the phrase "at least" were appended after each instance thereof. A clause using the term "whereby" merely states the result of the limitations in any claim in which it may appear and does not set forth an additional limitation therein. Both in the claims and in the description above, the conjunction "or" between alternative elements means "and/or," and thus does not imply that the elements are mutually exclusive unless context or a specific statement indicates otherwise.

What is claimed is:

1. A flying craft comprising:
   (a) a substantially rigid suspension structure having a first end and a second end;
   (b) a lift unit pivotally coupled to the first end of the suspension structure and including (1) a nacelle and (2) a tailboom pivotally coupled to the nacelle; and
   (c) a payload unit coupled to the second end of the suspension structure.

2. The flying craft of claim 1 wherein the nacelle houses a pair of engines.

3. The flying craft of claim 1 further comprising an aerodynamic lift structure of sufficient size to provide a majority of upward force from the lift unit during horizontal flight.

4. The flying craft of claim 3 wherein the aerodynamic lift structure includes a pair of pivotally coupled wing panels, wherein each panel is capable of selectably assuming either orientation of (a) being substantially parallel to the tailboom, and (b) extending substantially orthogonal from the tailboom.

5. The flying craft of claim 1 wherein the lift unit further includes a tailboom actuator coupled to pivot the tailboom with respect to the nacelle.

6. The flying craft of claim 1 wherein the lift unit further includes a rotor mounted on a hub at one end of the nacelle.

7. The flying craft of claim 6 wherein the lift unit further includes a tailboom actuator coupled to pivot the tailboom with respect to the nacelle.

8. The flying craft of claim 6 wherein the rotor consists substantially of two sets of rotor blades, the sets being independently rotatable about the hub.

9. The flying craft of claim 8 wherein the rotor has a radius that is slightly less than the distance between the first and second ends of the suspension structure.

10. The flying craft of claim 8 further comprising latchable pivot couplings between each of the blades and the hub, whereby the blades are selectably capable of orienting parallel to the tailboom for compact stowage of the craft.

11. The flying craft of claim 10 wherein the rotor has a radius of about 40 feet and the tailboom has a length of about 40 feet, whereby the blades are selectably capable of orienting parallel to the tailboom for compact stowage of the craft on a standard naval weapons elevator.

12. The flying craft of claim 6 wherein the tailboom includes a horizontal stabilizer and an elevator.

13. The flying craft of claim 12 wherein the tailboom further includes a vertical stabilizer and a rudder.

14. The flying craft of claim 6 further comprising a fastener connected to one of the tailboom and payload unit and latchably coupling the tailboom to the payload unit, wherein the tailboom, when latched to the payload unit, is fixed in an orientation substantially parallel to the suspension structure.

15. The flying craft of claim 14 wherein, when the tailboom is latched to the payload unit and resting on a surface, the lift unit is partially supported by the tailboom.

16. The flying craft of claim 6 wherein the lift unit is:
(a) freely rotatable, within at least a predetermined angular range, about a rotational axis orthogonal to an axis passing through the first and second ends of the suspension structure; and
(b) substantially restricted in movement relative to the first end of the suspension structure in a direction parallel to the rotational axis.

17. The flying craft of claim 6 wherein the payload unit lacks structure to support its own weight in flight and has at least a significant part of its weight suspended from the lift unit.

18. The flying craft of claim 17 wherein the payload unit includes a vertical stabilizer and a rudder.

19. The flying craft of claim 17 wherein the payload unit includes shipping container supports spaced about 20 feet apart from each other and about 10 feet from the second end of the suspension structure.

20. The flying craft of claim 6 further comprising an aerodynamic lift structure of sufficient size to provide a majority of upward force from the lift unit during horizontal flight and including a pair of pivotally coupled wing panels, wherein each panel is capable of selectably assuming either orientation of (a) being substantially parallel to the tailboom, and (b) extending substantially orthogonal from the tailboom.

21. The flying craft of claim 20 wherein:
(a) the rotor consists substantially of two sets of rotor blades, the sets being independently rotatable about the hub;
(b) the rotor has a radius that is slightly less than the distance between the first and second ends of the suspension structure; and
(c) the lift unit further includes a tailboom actuator coupled to pivot the tailboom with respect to the hub.

22. A system for transporting a payload, comprising:
(a) a lift unit including a rotor and a tailboom;
(b) a payload unit pivotally coupled to the lift unit such that the tailboom and payload unit are free to independently pivot with respect to each other about a first axis;
(c) means for operating the rotor of the lift unit to provide an aerial motive force;
(d) means for orienting the lift unit to develop the aerial motive force in a desired direction; and
(e) means for selectably (1) latching the tailboom to the payload unit in a substantially vertical orientation and (2) releasing the tailboom from the payload unit, thereby allowing it to pivot independently of the payload unit.

23. The system of claim 22 further comprising means for:
(a) permitting the lift unit to freely rotate, within at least a predetermined angular range, about a rotational axis orthogonal to an axis passing through the first and second ends of the suspension structure; and
(f) substantially constraining the lift unit from movement relative to the first end of the suspension structure in a direction parallel to the rotational axis.

* * * * *